(12) United States Patent  (10) Patent No.: US 7,784,656 B2
Morrill et al.  (45) Date of Patent: Aug. 31, 2010

(54) BUMPER AND BIKE RACK ASSEMBLY

(75) Inventors: Daniel D. Morrill, Owosso, MI (US); Ed Kravitz, Powell, OH (US)

(73) Assignee: Byk-Rak, LLC, Owosso, MI (US)

( * ) Notice: Subject to any disclaimer, the term of this patent is extended or adjusted under 35 U.S.C. 154(b) by 1333 days.

(21) Appl. No.: 11/234,681

(22) Filed: Sep. 23, 2005

(65) Prior Publication Data

US 2007/0069534 A1   Mar. 29, 2007

(51) Int. Cl.
    *B60R 19/48* (2006.01)
    *B60R 19/03* (2006.01)
    *B60R 9/00* (2006.01)
    *B60R 11/00* (2006.01)

(52) U.S. Cl. .................. 224/504; 224/512; 224/924; 293/117

(58) Field of Classification Search .............. 224/512, 224/513, 516, 517, 489, 490, 491, 504, 924; 293/114, 117, 120, 121
    See application file for complete search history.

(56) References Cited

U.S. PATENT DOCUMENTS

| 556,789 | A |   | 3/1896 | Walker |
|---|---|---|---|---|
| 576,351 | A |   | 2/1897 | Penfield |
| 607,024 | A |   | 7/1898 | Durfee et al. |
| 615,264 | A |   | 12/1898 | Du Pont |
| 1,522,339 | A | * | 1/1925 | Specht .............. 224/489 |
| 3,116,836 | A |   | 1/1964 | McCauley |
| 3,355,028 | A |   | 11/1967 | Mork |
| 3,367,548 | A |   | 2/1968 | Cooper |
| 3,510,146 | A |   | 5/1970 | Hartman |
| 3,529,737 | A |   | 9/1970 | Daugherty |

(Continued)

FOREIGN PATENT DOCUMENTS

SE           104714           6/1942

*Primary Examiner*—Nathan J Newhouse
*Assistant Examiner*—Corey N Skurdal
(74) *Attorney, Agent, or Firm*—Young Basile (57) ABSTRACT

A Bumper and bike rack assembly especially suitable for use as the front bumper assembly of a bus. The assembly includes a rigid structural member adapted to extend transversely of the bus and defining a series of laterally spaced slots extending vertically in a front wall of the member; a rubberized fascia member including a vertical front wall spaced forwardly of the front wall of the structural member and constituting the forward contact surface for the bumper and a series of laterally spaced notches respectively aligned with the slots in the structural member; and a bike rack including laterally spaced pivot arms each having a lower pivot end journaled on the structural member rearwardly of the front wall of the structural member and below a top wall of the structural member and extending from the pivot end outwardly through a respective slot in the structural member front wall and through an aligned notch in the fascia member for connection to a main body structure of the rack whereby to mount the rack for pivotal movement between a working position in which the pivot arms extend forwardly through the slots and aligned notches in the fascia to position the main body of the rack forwardly of the fascia and a raised, stowed position in which the pivot arms extend upwardly through the slots to position the rack above the fascia and rearwardly of the forward contact surface of the bumper.

9 Claims, 7 Drawing Sheets

U.S. PATENT DOCUMENTS

| | | | |
|---|---|---|---|
| 3,744,689 A | 7/1973 | Kjensmo | |
| 3,861,533 A | 1/1975 | Radek | |
| 3,921,842 A | 11/1975 | Campbell | |
| 4,125,214 A | 11/1978 | Penn | |
| 4,171,077 A | 10/1979 | Richard, Jr. | |
| 4,204,701 A | 5/1980 | Oltrogge | |
| 4,213,729 A | 7/1980 | Cowles et al. | |
| 4,360,135 A * | 11/1982 | Goble | 224/495 |
| 4,392,572 A | 7/1983 | Bernard | |
| 4,403,716 A | 9/1983 | Carlson et al. | |
| 4,413,761 A | 11/1983 | Angel | |
| 4,437,597 A | 3/1984 | Doyle | |
| 4,524,893 A | 6/1985 | Cole | |
| 4,607,858 A | 8/1986 | Wagner | |
| 4,702,401 A | 10/1987 | Graber et al. | |
| 4,815,638 A | 3/1989 | Hutyra | |
| 4,823,997 A | 4/1989 | Krieger | |
| 4,875,608 A | 10/1989 | Graber | |
| 5,022,649 A | 6/1991 | Traub et al. | |
| 5,029,740 A | 7/1991 | Cox | |
| 5,094,469 A * | 3/1992 | Yamamoto et al. | 280/500 |
| 5,154,462 A * | 10/1992 | Carpenter | 293/120 |
| 5,169,042 A | 12/1992 | Ching | |
| 5,236,342 A | 8/1993 | Pellettier | |
| 5,238,125 A | 8/1993 | Smith | |
| 5,246,120 A | 9/1993 | Walker | |
| 5,269,446 A | 12/1993 | Biehn | |
| 5,360,151 A | 11/1994 | Fine | |
| 5,522,530 A | 6/1996 | Boettcher | |
| 5,549,231 A | 8/1996 | Fletcher et al. | |
| 5,579,973 A | 12/1996 | Taft | |
| 5,685,469 A | 11/1997 | Stapleton | |
| 5,690,259 A | 11/1997 | Montani | |
| 5,692,659 A | 12/1997 | Reeves | |
| 5,755,454 A | 5/1998 | Peterson | |
| 5,775,560 A | 7/1998 | Zahn et al. | |
| 5,794,828 A | 8/1998 | Colan et al. | |
| 5,833,074 A | 11/1998 | Phillips | |
| 5,836,493 A | 11/1998 | Grunsted et al. | |
| 5,941,397 A | 8/1999 | Buchanan et al. | |
| 5,944,198 A | 8/1999 | Ihalainen | |
| 5,950,973 A | 9/1999 | Verma | |
| 5,984,111 A | 11/1999 | Pennella | |
| 5,996,870 A | 12/1999 | Shaver | |
| 6,047,869 A | 4/2000 | Chiu | |
| 6,050,426 A | 4/2000 | Leurdijk | |
| 6,053,336 A | 4/2000 | Reeves | |
| 6,089,430 A | 7/2000 | Mehls | |
| 6,092,706 A | 7/2000 | Bogan | |
| 6,095,387 A | 8/2000 | Lipscomb | |
| 6,244,483 B1 | 6/2001 | McLemore et al. | |
| 6,398,275 B1 * | 6/2002 | Hartel et al. | 293/102 |
| 6,511,250 B2 | 1/2003 | Lindsay | |
| 6,709,036 B1 * | 3/2004 | Evans | 293/120 |
| 6,968,986 B1 | 11/2005 | Lloyd et al. | |
| 6,976,615 B2 | 12/2005 | Dean | |
| 7,410,082 B2 | 8/2008 | Stewart | |
| 2005/0056672 A1 | 3/2005 | Stewart | |

* cited by examiner

BUMPER AND BIKE RACK ASSEMBLY

BACKGROUND OF THE INVENTION

This invention relates to motor vehicle bumper assemblies and more particularly to a bumper assembly including an attached bike rack.

Front bumper assemblies for busses often include a bike rack mounted on the bumper and moveable between a forwardly extending working position for receipt of one or more bicycles and an upwardly extending stowage position. Whereas these racks are generally satisfactory, they interfere with the front of the bumper assembly even when in the stowed position with the result that impact of the bumper with an impact surface may result in damage to the bike rack, damage to the front of the bus, damage to the impacted surface, and overall degradation of the crush resistant capacity of the bumper assembly.

SUMMARY OF THE INVENTION

This invention relates to an improved bumper and bike rack assembly.

More particularly this invention relates to a bumper and bike rack assembly wherein impact of the bumper with an impact surface with the bike rack in its stowed position does not damage the bike rack, does not damage the front end of the bus, it does not damage the impacted surface, and does not degrade the crush resistant capacity of the bus.

The invention relates to a motor vehicle bumper and bike rack assembly comprising a bumper structure defining a frontal contact surface and a bicycle rack mounted on the bumper structure and moveable between a working position extending generally forwardly of the bumper structure and a stowed position extending generally vertically upwardly from the bumper structure.

According to the invention, with the bike rack in its stowed position, the frontal contact surface of the bumper assembly is frontally unobstructed by the bike rack so that the contact surface may engage an impact surface without damage to the bicycle rack and without damage to the impact surface from the bicycle rack.

According to a further feature of the invention, with the bike rack in its stowed position, all aspects of the rack are positioned rearwardly of a vertical plane containing the bumper structure frontal contact surface.

According to a further feature of the invention, the bumper assembly includes a rubberized fascia which defines the frontal contact surface.

According to a further feature of the invention, the bumper assembly further includes a rigid structural member mounting the fascia and covered by the fascia and the bicycle rack is mounted to the rigid structural member.

According to a further feature of the invention, the bumper and bike rack assembly further includes a beam member adapted to be secured to the front end of the vehicle and extend transversely with respect to the front end of the vehicle and the rigid structural member is mounted on the beam member.

According to a further feature of the invention, the fascia includes a plurality of laterally spaced, frontally and upwardly opening notches; the bicycle rack includes laterally spaced mounting arms; and each mounting arm has a lower pivotal end received in a respective notch.

According to a further feature of the invention, the bicycle rack further includes a latch member having a lower end received in a further respective notch in the fascia.

According to a further feature of the invention, the rigid structural mechanism includes a plurality of slots respectively aligned with the notches in the fascia and the pivotal lower ends of each mounting arm and the lower end of the latch mechanism are also received in a respective slot in the rigid structural member.

According to a further feature of the invention, the rigid structural member includes a vertical front wall and a horizontal top wall extending rearwardly from the front wall; each of the slots extends vertically in the front wall and then continues rearwardly in the top wall; and the lower end of the latch mechanism comprises a latch finger passing through a notch in the fascia and an aligned slot in the structural member for latching coaction with selected detents in a latch plate positioned on the structural member behind the front wall of the structural member and below the top wall of the structural member.

The invention also provides an improved retro-fitting methodology for use with a bumper assembly of the type including a structural beam member, a plurality of separate fascia members secured in serial fashion to the beam member and extending forwardly from the beam member to provide crush resistance, and a bicycle rack mounted for movement between a working position extending generally forwardly of a central fascia member and a stowed position extending generally vertically upwardly from the central fascia member.

According to the invention methodology, a central fascia member and the bike rack are removed and the central fascia member and bike rack are replaced with a replacement fascia member and a replacement bike rack in which, with the bike rack in its stowed position, the frontal contact surface of the replacement fascia member is frontally unobstructed by the replacement bike rack so that the central fascia member may engage an impact surface without damage to the replacement bike rack, without damage to the impact surface, and without degradation of the crush resistant capability of the retro fitted bumper assembly.

According to a further feature of the invention methodology, with a replacement bike rack in a stowed position, all aspects of the replacement bike rack are positioned rearwardly of a vertical plane containing the frontal contact surface of the replacement fascia member.

DETAILED DESCRIPTION OF THE PREFERRED EMBODIMENT

The bumper and bike rack assembly of the invention, broadly considered, includes a bumper assembly 10 and a bike rack 12.

Bumper assembly 10 includes a beam member 14, bracket 16, a channel member 18, a central fascia member 20, central fascia member primary clamps 22 and 23, central fascia member auxiliary clamps 24, end fascia members 26, end fascia member primary clamps 28, and end fascia member auxiliary clamps 30.

Beam member 14 includes a main body tubular portion 14a extending transversely of the front end of a bus 32 and suitably secured to the frame structure of the bus, and end portions 14b fixedly secured to the respective ends of the main body portion 14a and extending around the front corners of the bus and rearwardly along the sides of the bus toward the front wheel wells 32a. Beam member 14 is typically formed from steel.

Brackets 16 may be formed as elongated aluminum extrusions and are adapted to be fixedly secured to the upper face 14c and the lower face 14d of the main body portion 14a of beam member 14 utilizing bolts 34 passing through bracket rearward flange portions 16a. Each bracket further includes an abutment flange 16b configured to be positioned against the front face 14e of the beam member, a main body portion 16c, and a recessed forward flange portion 16d separated from the main body portion 16c by a shoulder 16e.

Channel member 18, which may be formed of steel, has a rearwardly opening U-shaped cross-sectional configuration and includes a central main body portion 18a and rearwardly angled end portions 18b. A plurality of laterally spaced slots or notches 18c are provided in main body portion 18a. Each slot or notch includes a vertically extending portion 18d provided in the front wall 18e of the channel member and a horizontally extending portion 18f provided in the top wall 18g of the channel member and connected to the vertically extending portion 18d to form a continuous inverted "L" shaped slot.

Central fascia member 20 is a molded member and is formed of a suitable rubberized material such as urethane or neoprene. Fascia member 20 includes a main body portion 20a and rearwardly angled end portions 20b and, in general, has a hollow rearwardly opening "U" shaped cross-sectional configuration including a top wall 20c, a bottom wall 20d and a front wall 20e. Fascia member 20 further includes a bead 20f along its upper and lower rearward edges and is formed with three laterally spaced upwardly and forwardly opening notches 20g, 20h and 20i. Each notch opens in the upper and front walls of the fascia and is bounded at its lower end by a wall 20j and at its opposite sides by side walls 20k. The upper rear bead 20f is broken at laterally spaced locations in alignment with notches 20g, 20h and 20i. End portions 20b are angled rearwardly with respect to the main body portion at an angle corresponding to the angle of the rearwardly angled sections 18b of channel member 18. Fascia 20 further includes a plurality of vertical laterally spaced crush ribs 201.

Upper and lower central fascia member primary clamps 22, 23 include a rearward mounting flange portion 22a/23a and a forward socket portion 22b/23b. The forward socket portion 22b of the upper clamp is interrupted at laterally spaced locations along its length to correspond to the interruptions in the top rear bead 20f of central fascia member 20.

Central fascia member auxiliary clamps 24 have a cross-sectional configuration corresponding to the cross-sectional configuration of primary clamps 22/23 and include a mounting flange portion 24a and a socket portion 24b.

In the assembled relation of brackets 16, channel member 18, fascia 20 and clamps 22-24, the rear edges 18h of channel member 18 are sandwiched between the flange portions 16d of brackets 16 and the mounting flange portions 22a/23a of primary clamps 22 and 23, with the sandwiches held together by bolts 36, and the beads 20f of fascia 20 are received in socket portions 22b/23b of primary clamps 22/23 with the upper and lower rearward edge portion 20k of fascia 20 positioned over the upper and lower forward edge portions of channel member 18 and with sidewalls 20k, bottom walls 20j and ribs 201 positioned against the front face 18e of channel member 18 to provide crush resistance. Similarly, auxiliary clamps 24 are fastened to the upper and lower walls of the end portions 18b of channel member 18 with their socket portions 24b receiving the end portions of the fascia beads 20f. The end edges of brackets 16 will be seen to be beveled to accommodate the angled disposition of the end portions 18b of channel member 18.

End fascias 26 are formed of a molded, rubberized material identical to the material of central fascia member 20 and have a "U" shaped rearwardly opening cross-sectional configuration including beads 26a along the upper and lower rear edges of the top and bottom walls 26b/26c and vertical crush ribs 26d provided at laterally spaced locations. End fascias 26 are mounted on respective end portions of the beam member 14 utilizing socket portions 28a of primary clamps 28. The mounting flange portions 28b of the primary clamps 28 are fastened to upper and lower walls of the beam member utilizing fasteners 38. Each fascia member 26 includes a rearwardly extending corner portion 26e including upper and lower beads 26f, forming respective continuations of beads 26a, received in socket portions 30a of auxiliary clamps 30 having mounting flange portions 30b fixedly secured to upper and lower walls of end portions 14b utilizing fasteners 40. It will be understood that, in the assembled relation of the bumper assembly, the end edges 26g of the end fascias 26 are positioned in substantially abutting engagement with the end edges 20m of the central fascia to form a continuous fascia extending across the entire front face of beam member 14 and further covering the end beam member portions 14b. It will be further understood that crush ribs 26d of end fascias 26 coact with the front face of bead member 14 to provide crush resistance to frontal impact and crush ribs 201 of central fascia 20 coact with channel member 18 to provide impact crush resistance in the central region of the bumper assembly.

Bike rack 12 has a tubular construction and includes a main frame 42, pivot arms 44, cradles or carriers 46, lock arms 48, and a latch mechanism 50.

Main frame 42 has a generally rectangular tubular configuration including side rails 42a and upper and lower end rails 42b and 42c.

Figure 1:
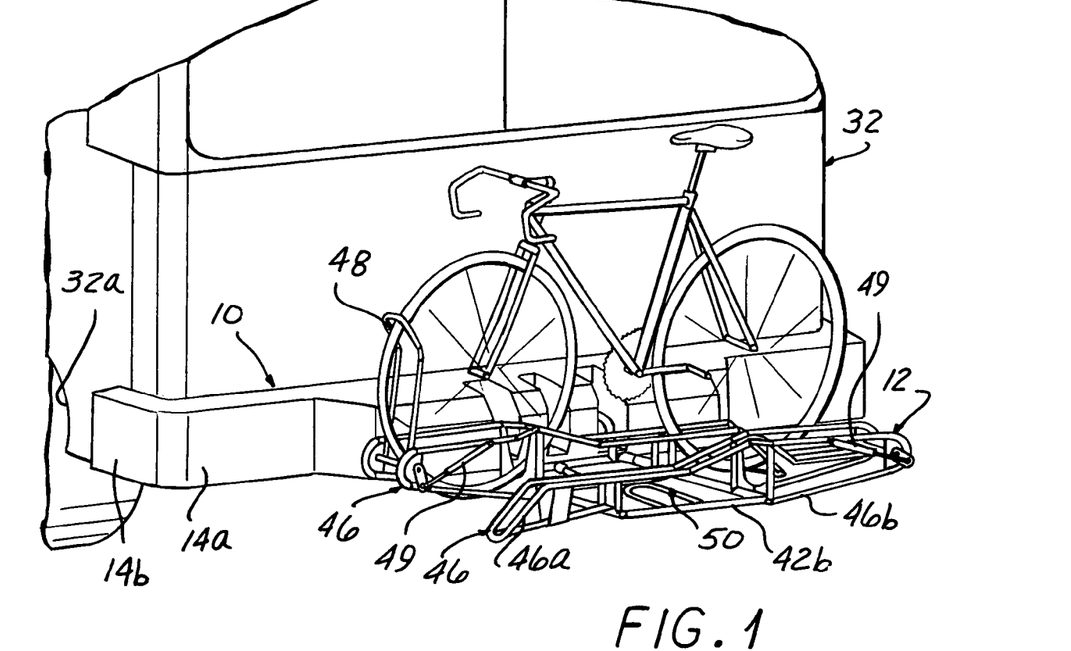
FIG. 1 is a perspective view of a bumper and bike rack assembly constituting the front bumper assembly of a bus and showing the bike rack in a forwardly extending bicycle carrying position.
Figure 2:
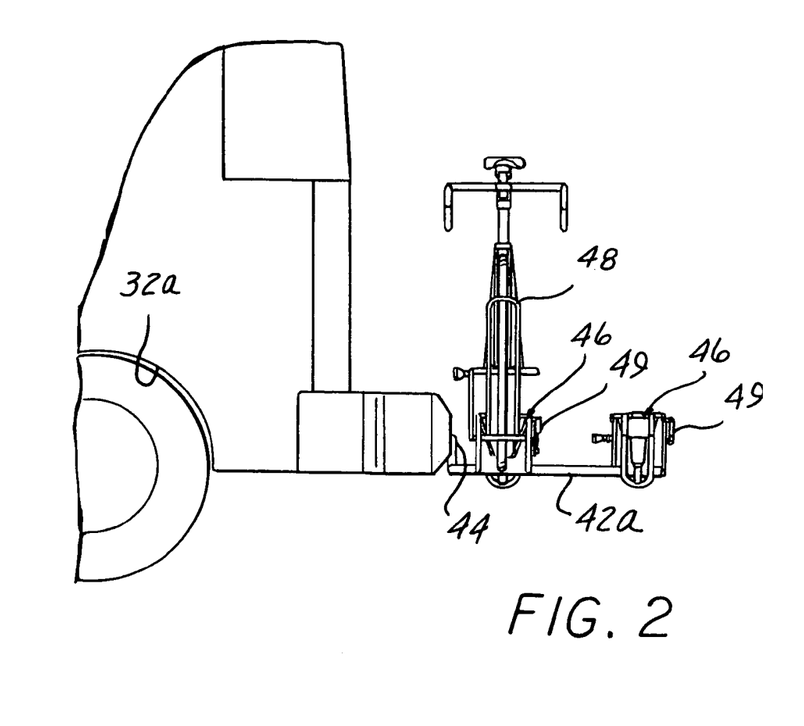
FIG. 2 is a side view of the bumper and bike rack assembly showing the bike rack in the bicycle carrying forwardly extending position.
Figure 3:
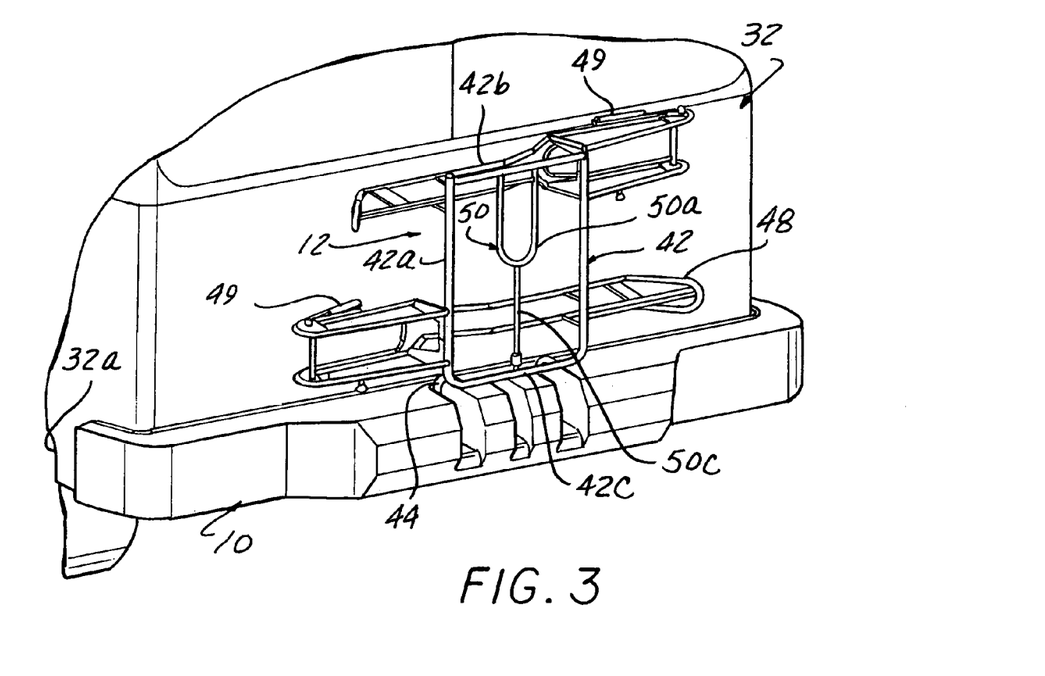
FIG. 3 is a perspective view showing the bicycle rack in a raised upwardly extending stowed position.
Figure 4:
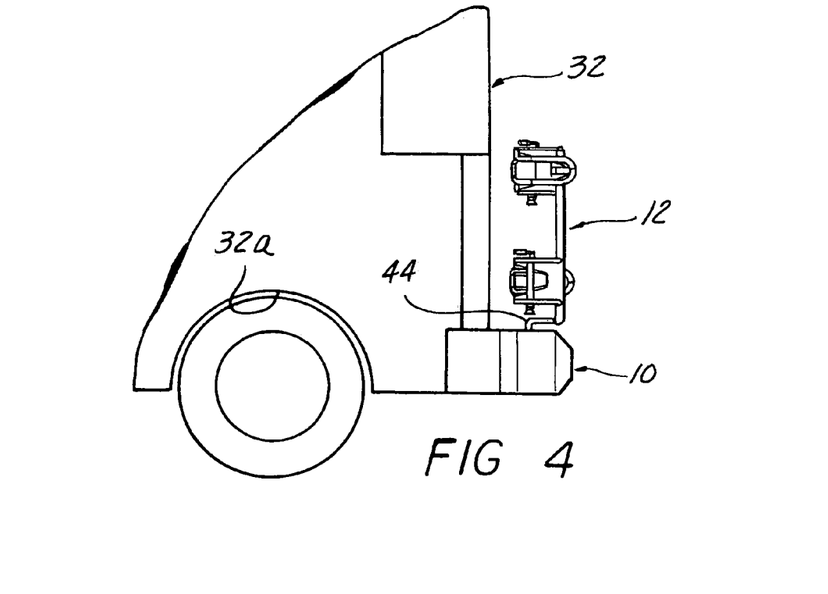
FIG. 4 is a side view showing the bike rack in the stowed position.
Figure 5:
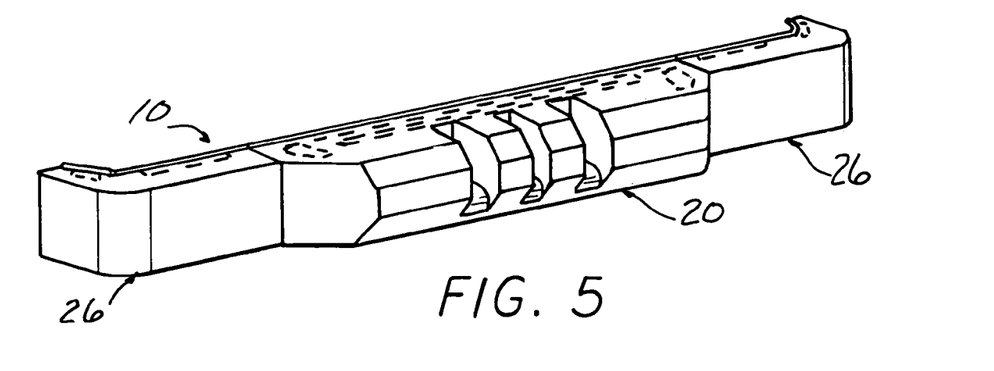
FIG. 5 is a perspective view of the bumper assembly.
Figure 6:
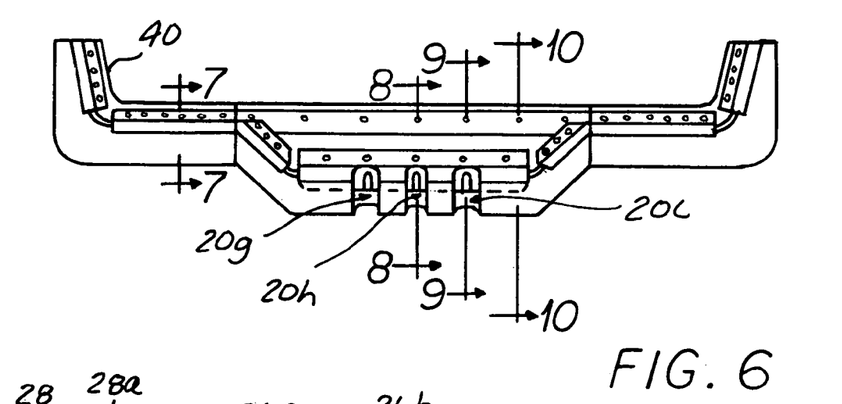
FIG. 6 is a plan view of the bumper assembly.
Figure 7:
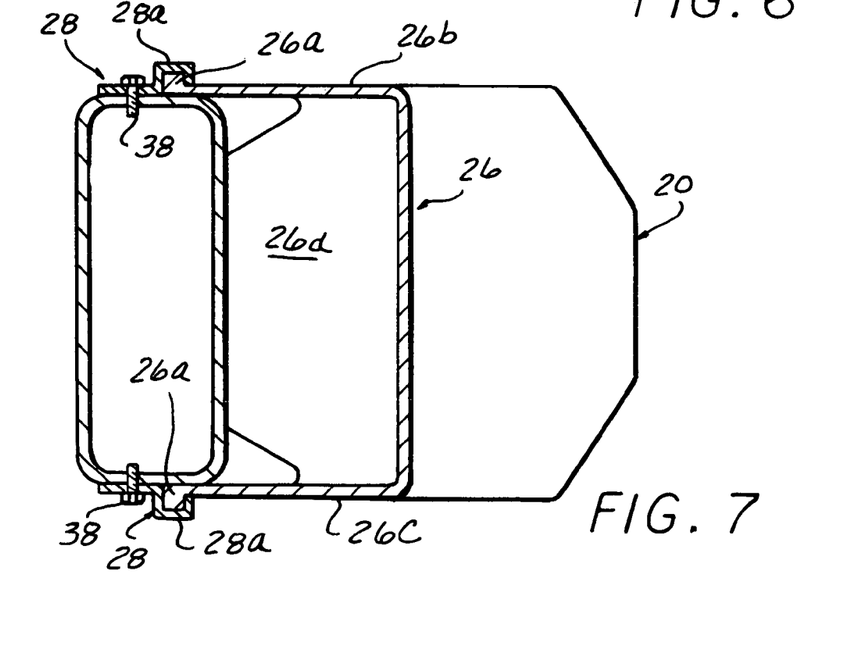
FIGS. 7, 8, 9, and 10 are cross-sectional views taken respectively on lines 7-7, 8-8, 9-9, and 10-10 of FIG. 6.
Figure 8:
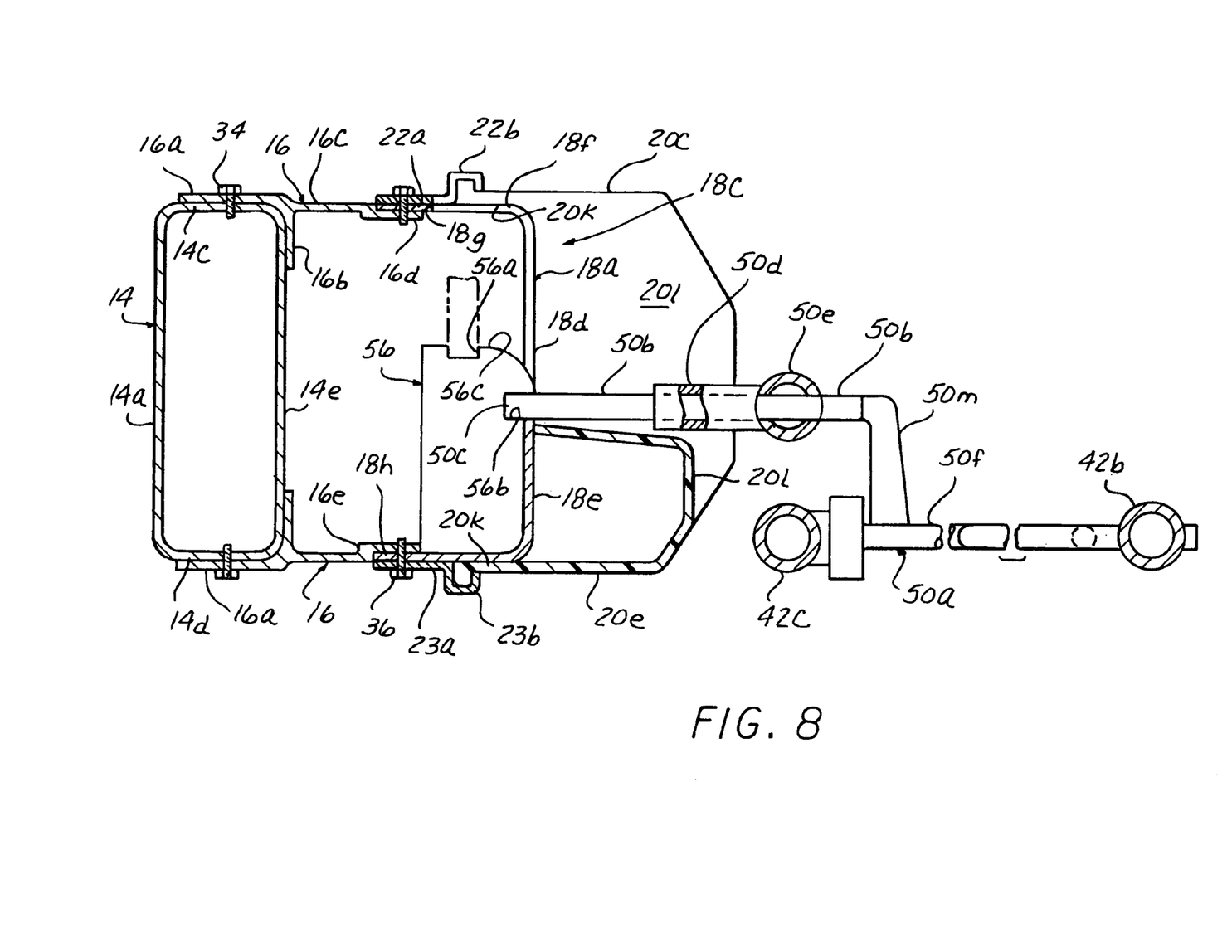
Figure 8A:
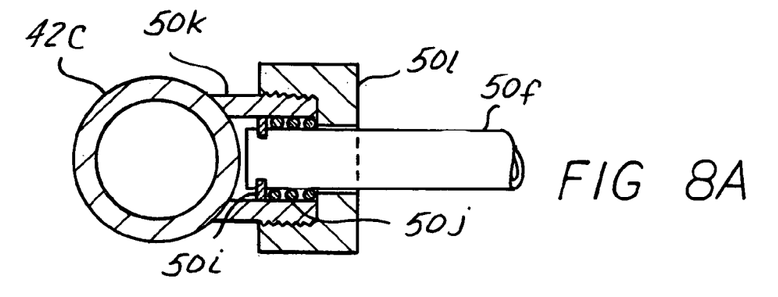
FIGS. 8A and 8B are detailed views of the FIG. 8 showing.
Figure 8B:
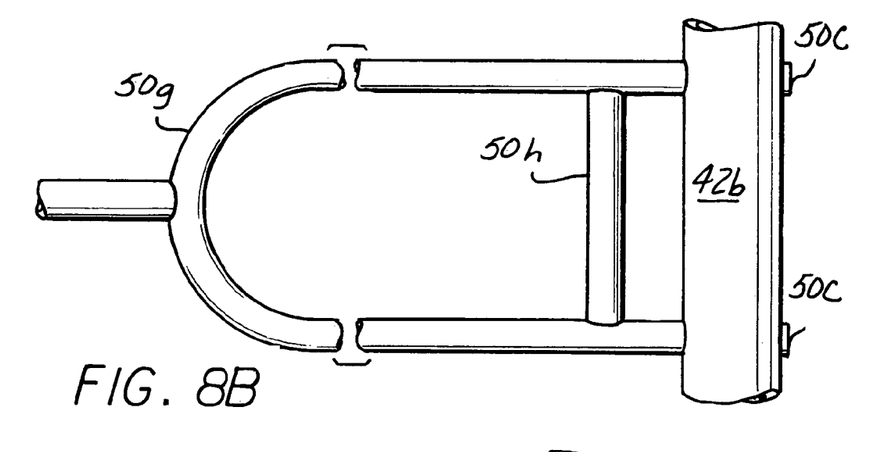
Figure 9:
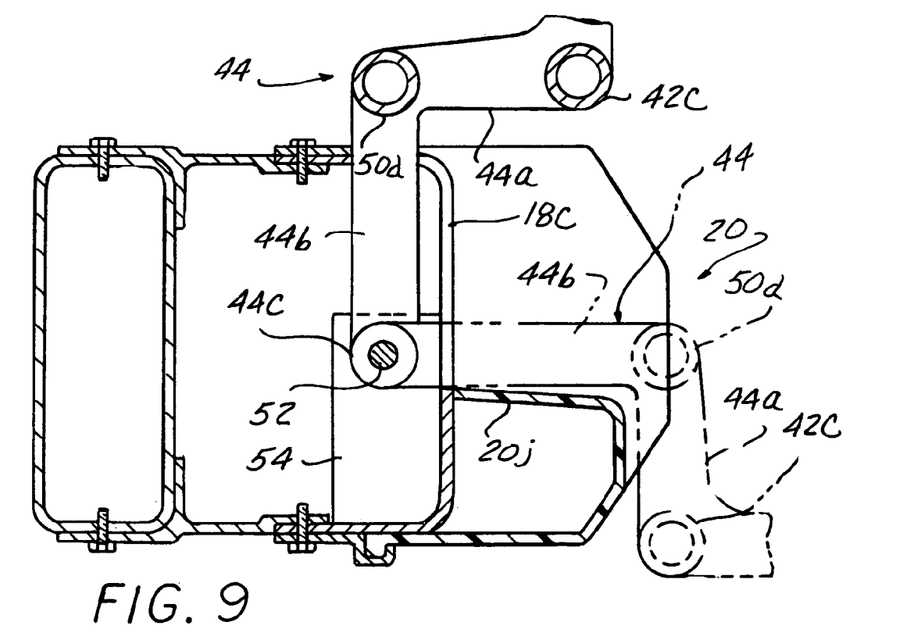
Figure 10:
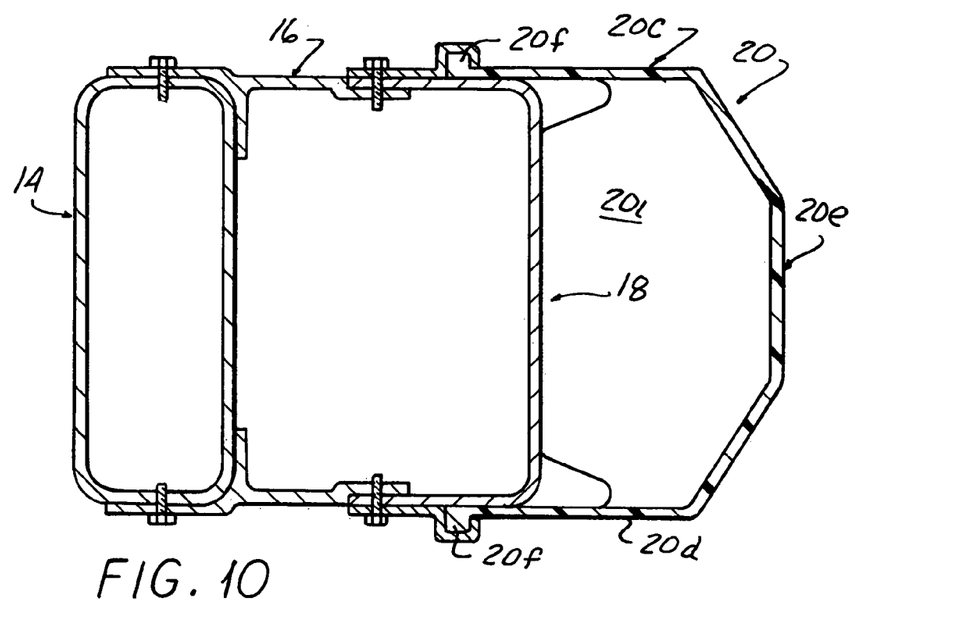
Figure 11:
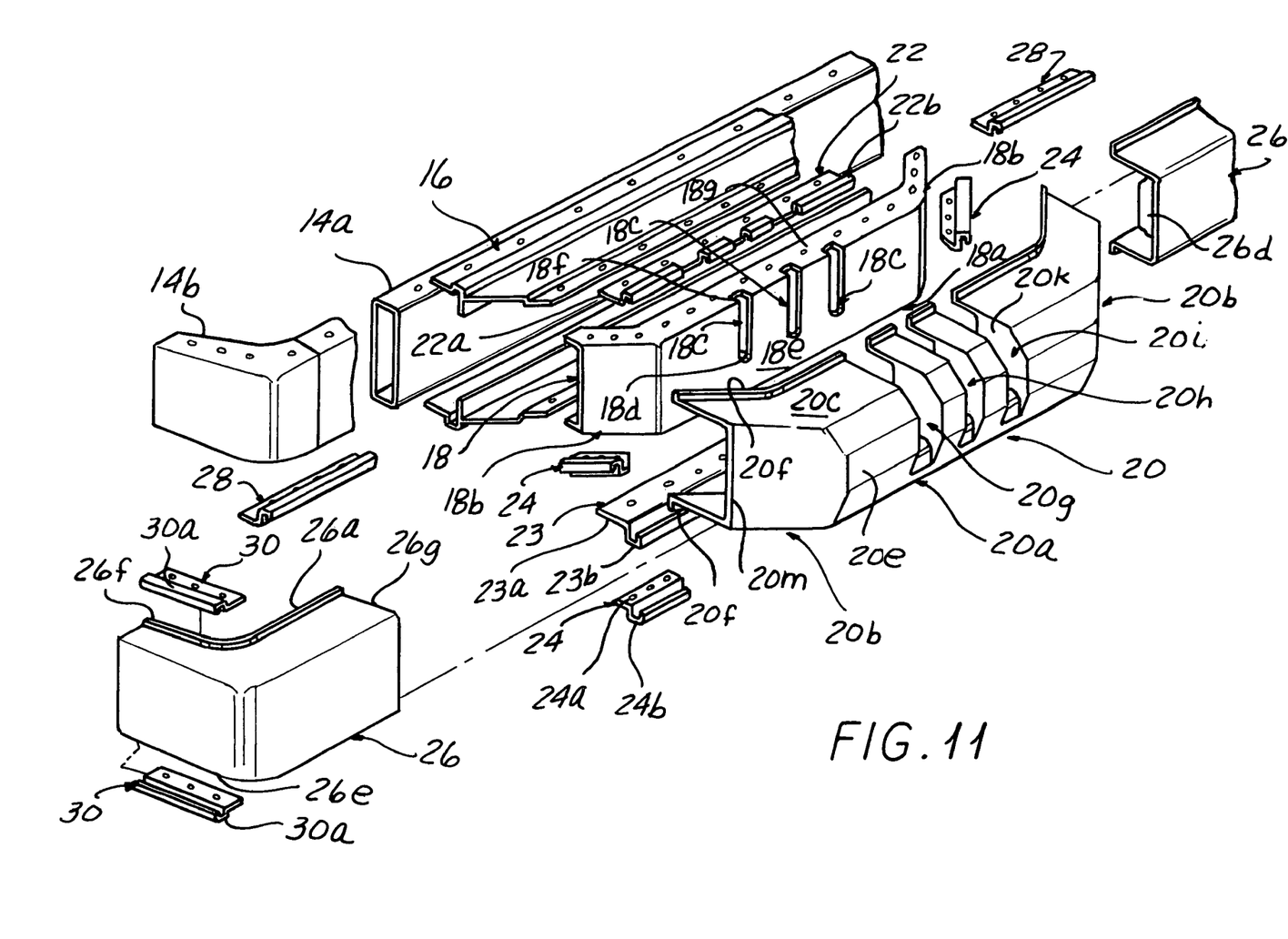
FIG. 11 is an exploded perspective view of the bumper assembly.

Pivot arms 44 have a flat, blade cross-sectional configuration, have an "L" shaped overall configuration, and extend in laterally spaced relation from lower frame end rail 42c. Specifically, each pivot arm 44 has a crank arm portion 44a and a lower arm portion 44b terminating in a journal 44c. Each journal 44c is journaled on a pin 52 carried by spaced lug plates 54 positioned in flanking relation with respect to each outboard slot 18c in channel member 18. The laterally spaced journals 44c on the lower ends of the spaced pivot arms thus mount the bike rack for pivotal movement between the working or lowered position seen in FIGS. 1 and 2 and the raised or stowed position seen in FIGS. 3 and 4 with the flat lower arm portions 44b guiding in the respective slots 18c in channel member 18 and moving in the respective notches 20g/20i in fascia 20 to accommodate the pivotal movement of the bike rack between its lowered and raised positions. In the lowered position, the weight of the bike rack is borne by the engagement of lower pivot arm portions 44b with fascia walls 20j.

Each cradle 46 accommodates a single bicycle and specifically defines a relatively short first or front well 46a to receive the front wheel of a bicycle and a relatively long second or rear well 46b to receive the back wheel of the bicycle. The front and rear cradles 46 are preferably reversed so that the short front wheel well of the front cradle confronts the long rear wheel well of the rear cradle and the long rear wheel well of the front cradle confronts the short front wheel well of the rear cradle.

A pivotal lock arm 48 is associated with each cradle. Specifically, following placement of a bike in a cradle the respective lock arm 48 is pivoted upwardly into grasping relationship with the front wheel of the bicycle. An air spring 49 is associated with each lock arm 48 and serves to maintain the lock arm in tight engaging relationship with the front wheel to preclude displacement of the bicycle from the respective cradle.

Latch mechanism 50 includes a handle 50a, a latch finger 50b, and a latch arm 50m interconnecting the handle 50a and the latch finger 50b. The free end 50c of latch finger 50b coacts with a latch plate 56 positioned in channel member 18 proximate central slot 18c and rearwardly of front wall 18e. Latch finger 50b slidably guides in a guide to 50d secured to a cross arm 50e extending rigidly between pivot arms 44 at the juncture of crank arm portions 44a and lower arm portions 44b. Finger 50b will be seen to pass slidably through cross arm 50e and thence through guide tube 50d to position free end 50c for coaction with latch plate 56. Latch plate 56 defines a pair of angularly spaced detents 56a and 56b interconnected by an arcuate cam surface 56c. With the rack in the lowered position latch finger free end 50c coacts with detent 56b to maintain the rack in the lowered position and, in the raised position of the bike rack, finger free end 50c coacts with detent 56a to maintain the rack in the raised position.

Handle 50a includes a main rod 50f, a yoke 50g, and a squeeze bar 50h. The free ends 50i of yoke 50g guide slidably in frame member 42b and the free end of rod 50f carries a "C" clip 50i coacting with a coil spring 50j surrounding the free end of the rod and received in a tube 50k secured to frame member 42c with a nut 50l threaded onto tube 50k to preclude displacement of spring 50.

It will be seen that a squeezing force exerted on squeeze bar 50h releases the free end 50c of the latch finger from the engaged detent against the resistance of spring 50j whereafter the rack may be moved to the alternate position with the finger free end guiding along and against cam surface 56c under the urging of spring 50j until the other detent is reached and engaged.

It will be seen that as the rack is moved between its lowered and raised positions the latch finger moves within the central slot 18c of the channel member 18 and within the notch 20h in fascia member 20.

The bumper and bike rack assembly thus far described comprises a complete assembly intended for installation on the front end of a bus during original equipment manufacture of the bus or as a total replacement for an existing front bumper and bike rack assembly.

Figures 12, 13:
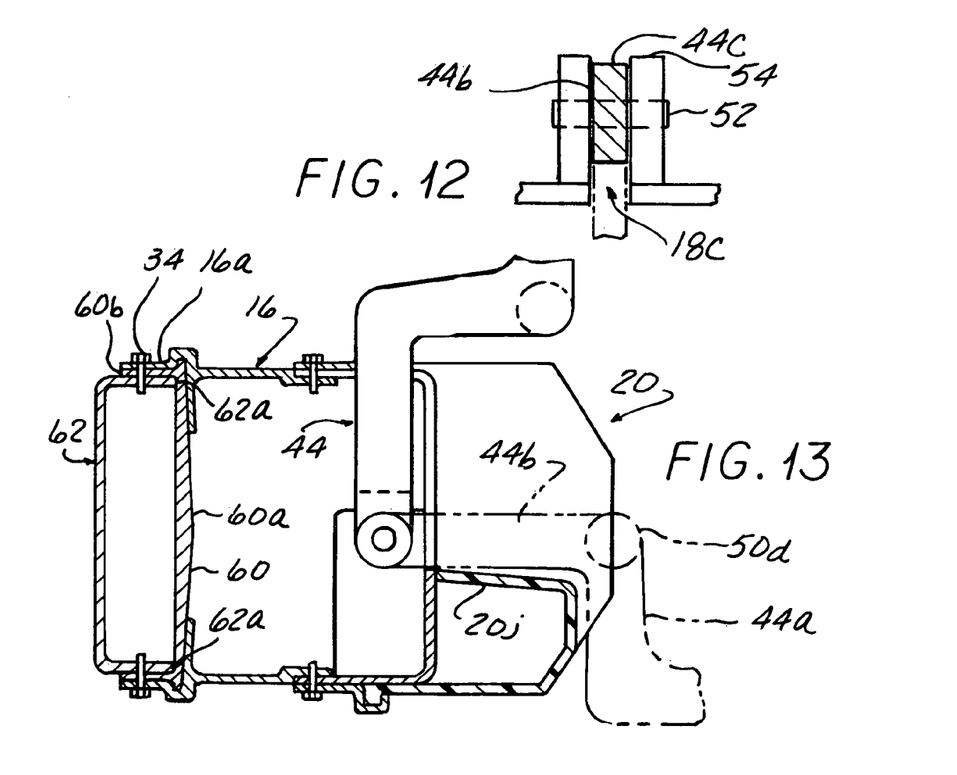
FIG. 12 is a detail view of the bumper assembly.
FIG. 13 is a cross-sectional view of a retrofit embodiment of the bumper assembly.

The bumper and bike rack assembly seen in FIG. 13 is intended for use in retrofitting an existing front bumper and bike rack assembly and, specifically, contemplates that the central fascia of an existing energy absorbing front bumper would be removed along with the attached bike rack whereafter a center fascia and bike rack in accordance with the invention would be installed in place of the removed fascia and bike rack. The retrofit central fascia and bike rack assembly seen in FIG. 13 corresponds generally to the central fascia and bike rack assembly described with respect to FIGS. 1-12 with the exception that the assembly includes a further aluminum extrusion 60 which is sized to be fitted against a forwardly opening channel beam member 62 typically utilized as the foundation member for a bus front bumper assembly. Specifically, the extrusion 60 includes a main body portion 60a, engaging the forward end edges 62a of the upper and lower flanges of the channel member 62, and upper and lower flange portions 60b sandwiched between the flange portions 16a of the brackets 16 and the respective upper and lower flanges of the channel member 62 with the sandwiches held in place by bolts 34.

It will be understood that, in the retrofit embodiment of the invention, the end fascias of the existing energy absorbing bumper assembly would remain in place and only the central fascia, together with the associated bike rack, would be removed and replaced with the retrofitted bumper and bike rack assembly of the invention.

The bumper and bike rack assembly of the invention, whether in the original equipment configuration of FIGS. 1-12 or the retrofit configuration of FIG. 13, provides many important advantages as compared to prior art bumper and bike rack assemblies. Specifically, since with the bike rack in the raised position the front face 20e of the central fascia is frontally unobstructed and all aspects of the bike rack are positioned rearwardly of a vertical plane containing the front face 20e, the bus may be maneuvered without concern for inadvertent impact with impact surfaces since any such impact would be absorbed by the energy absorbing capacity of the bumper, would not damage the bumper, would not damage the surface impacted, would not damage the bike rack, and would not damage the front end of the bus. By comparison, in existing bumper and bike rack arrangements wherein the mounting for the bike rack is positioned forwardly of the fascia, inadvertent impact of the bumper and bike rack assembly with an impact surface, even with the bike rack in the stowed position, may result in damage to the bumper, damage to the impacted surface, damage to the bike rack, and potential damage to the front of the bus resulting from the bike rack being thrust rearwardly into the front end of the bus as a result of the impact.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A motor vehicle bumper and bike rack assembly comprising
   a bumper structure defining a frontal contact surface and including:
      a rubberized fascia which defines the frontal contact surface, wherein the fascia includes a plurality of laterally spaced, frontally and upwardly opening notches; and
      a rigid structural member mounting the fascia and covered by the fascia;
   a bicycle rack mounted to the rigid structural member of the bumper structure
      a beam member adapted to be secured to a front end of the vehicle and extend transversely with respect to the front end of the vehicle, wherein the rigid structural member is mounted on the beam member
   wherein the bicycle rack includes laterally spaced mounting arms and each mounting arm has a lower pivotal end received in a respective notch, the bicycle rack moveable between a working position extending generally forwardly of the bumper structure and a stowed position extending generally vertically upwardly from the bumper structure characterized in that:
  with the bike rack in its stowed position, the frontal contact surface of the bumper structure is frontally unobstructed by the bike rack so that the contact surface may engage an impact surface without damage to the bicycle rack and without damage to the impact surface from the bicycle rack and
  with the bike rack in its stowed position, all aspects of the rack are positioned rearwardly of a vertical plane containing the bumper structure frontal contact surface.

2. A bumper end bicycle rack assembly according to claim 1 wherein:
  the bicycle rack further includes a latch member having a lower end received in a further respective notch in the fascia.

3. A bumper and bicycle rack assembly according to claim 1 wherein:
  the rigid structural member includes a plurality of slots respectively aligned with the notches in the fascia; and
  the pivotal lower end of each mounting arm and the lower end of the latch member are also received in a respective slot in the rigid structural member.

4. A bumper and bike rack assembly for a motor vehicle including;
  a rigid structural member adapted to extend transversely of the vehicle, including a vertical front wall and a horizontal top wall extending rearwardly from the vertical front wall, and defining a series of laterally spaced slots extending vertically in the front wall and then continuing rearwardly in the top wall;
  a rubberized fascia member defining a vertical front wall spaced forwardly of the front wall of the structural member and defining a forward contact surface for the bumper, and a horizontal top wall extending rearwardly from the front wall and secured to the structural member, and defining a series of laterally spaced notches respectively aligned with the slots in the structural member, extending vertically in the front wall and then continuing rearwardly in the top wall;
  a bike rack including laterally spaced pivot arms each having a lower pivot end journaled on the structural member rearwardly of the front wall of the structural member and below the top wall of the structural member, and extending from the pivot end outwardly through a respective slot in the structural member front wall and through an aligned notch in the fascia member for connection to a main body structure of the rack whereby to mount the rack for pivotal movement between a working position in which the pivot arms extend forwardly through the slots and aligned notches in the fascia to position the main body of the rack forwardly of the fascia and a raised, stowed position in which the pivot arms extend upwardly through the slots to position the rack above the fascia.

5. A bumper and bike rack assembly according to claim 4 wherein the bike rack further includes a latch mechanism including a latch finger passing through a notch in the fascia and an aligned slot in the structural member for latching coaction with selected detents in a latch plate positioned on the structural member behind the front wall of the structural member and below the top wall of the structural member, the finger extending forwardly through the respective slot and through the aligned notch with the rack in the working position and extending upwardly through the respective slot with the rack in the stowed position.

6. A bumper assembly and bike rack according to claim 4 wherein:
  the bumper is adapted to constitute the front bumper of a bus;
  the bumper and bike rack assembly further includes a beam member adapted to be secured to the front of the bus and extend transversely across the front end of the bus; and
  the rigid structural member is connected to the beam member in forwardly spaced relation.

7. A bumper and bike rack assembly according to claim 6 wherein the rigid structural member is connected to the beam member by bracket structures secured to the beam member and extending forwardly from the beam member for securement to the rigid structural member.

8. A bumper and bike rack assembly according to claim 7 wherein:
  the rubberized member has a rearwardly opening U-shaped cross-sectional configuration and includes beads extending along upper and lower edges of the member; and
  the bumper and bike rack assembly further includes clamp members secured to the bracket structures and clampingly engaging the beads to fasten the rubberized member to the rigid structural member.

9. A motor vehicle bumper and bike rack assembly comprising:
  a bumper structure defining a frontal contact surface and, the bumper structure including a rubberized fascia which defines the frontal contact surface wherein the fascia includes a plurality of laterally spaced, frontally and upwardly opening notches; and
  a bicycle rack mounted on the bumper structure wherein the bicycle rack includes:
    a main frame defined in part by an upper rail and a lower rail;
    at least one mounting arm laterally extending from the lower rail and having an upper portion and a lower portion, the lower portion configured to connect to the bumper structure;
    at least one cradle mounted on the main frame and between the upper and lower rails of the main frame, the cradle configured to carry a bicycle; and
    a latch member having a lower end received in a further respective notch in the fascia
  and wherein the bicycle rack is moveable between a working position extending generally forwardly of the bumper structure and a stowed position extending generally vertically upwardly from the bumper structure characterized in that:
    with the bike rack in its stowed position, the frontal contact surface of the bumper structure is frontally unobstructed by the bike rack so that the contact surface may engage an impact surface without damage to the bicycle rack and without damage to the impact surface from the bicycle rack and
    with the bike rack in its stowed position, all aspects of the rack are positioned rearwardly of a vertical plane containing the bumper structure frontal contact surface.

* * * * *